United States Patent
Chi et al.

(10) Patent No.: US 12,425,251 B2
(45) Date of Patent: Sep. 23, 2025

(54) METHOD FOR BACKBONE NODE ACCESS AND BLOCKCHAIN SYSTEM

(71) Applicant: CHINA ACADEMY OF INFORMATION AND COMMUNICATIONS TECHNOLOGY, Beijing (CN)

(72) Inventors: Cheng Chi, Beijing (CN); Yuwen Zhang, Beijing (CN); Yang Liu, Beijing (CN); Siyu Zhu, Beijing (CN); Juan Tian, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 30 days.

(21) Appl. No.: 18/705,314

(22) PCT Filed: Jun. 6, 2022

(86) PCT No.: PCT/CN2022/097228
§ 371 (c)(1),
(2) Date: Apr. 26, 2024

(87) PCT Pub. No.: WO2023/077796
PCT Pub. Date: May 11, 2023

(65) Prior Publication Data
US 2025/0007740 A1    Jan. 2, 2025

(30) Foreign Application Priority Data
Nov. 4, 2021 (CN) .......................... 202111297094.X

(51) Int. Cl.
*G06F 15/16* (2006.01)
*H04L 9/00* (2022.01)
*H04L 41/00* (2022.01)

(52) U.S. Cl.
CPC ................. *H04L 9/50* (2022.05); *H04L 41/30* (2013.01); *H04L 2209/463* (2013.01); *H04L 2209/80* (2013.01)

(58) Field of Classification Search
CPC ..... H04L 9/50; H04L 41/30; H04L 2209/463; H04L 2209/80; H04L 9/3239; H04L 9/3247
See application file for complete search history.

(56) References Cited

U.S. PATENT DOCUMENTS

2019/0394267 A1* 12/2019 Bistram ................ H04L 67/108
2020/0366495 A1* 11/2020 Mahoney .............. H04L 9/3297
2021/0266163 A1*  8/2021 Zeng ........................ H04L 9/30

FOREIGN PATENT DOCUMENTS

| CN | 108280646 A | 7/2018 |
|----|-------------|--------|
| CN | 110868308 A | 3/2020 |

(Continued)

OTHER PUBLICATIONS

International Search Report of PCT/CN2022/097228 mailed Aug. 18, 2022, 2 pages.

*Primary Examiner* — Razu A Miah
(74) *Attorney, Agent, or Firm* — BROOKS KUSHMAN P.C.

(57) ABSTRACT

A backbone node access method and a blockchain system are disclosed. In the backbone node access method, after receiving an access request of a backbone node in a second blockchain system, a first node of a first blockchain system determines a voting node and requests the voting node to vote on the access request; the voting node feeds back a voting result; after determining to approve the access request according to the voting result, the first node determines a second node and sends anchoring message to the second node; and the second node is anchored with the backbone node based on the anchoring message, so that the backbone (Continued)

node accesses to the first blockchain system, the second blockchain system becomes a slave chain system of the first blockchain system, and the first blockchain system becomes a master chain system of the second blockchain system.

15 Claims, 7 Drawing Sheets

(56) References Cited

FOREIGN PATENT DOCUMENTS

| | | | |
|---|---|---|---|
| CN | 111683118 | A | 9/2020 |
| CN | 113726913 | A | 11/2021 |
| WO | 2020173499 | A1 | 9/2020 |

\* cited by examiner

METHOD FOR BACKBONE NODE ACCESS AND BLOCKCHAIN SYSTEM

This application is the U.S. national phase of PCT Application No. PCT/CN2022/097228 filed on Jun. 6, 2022, which claims priority to Chinese Patent Application No. CN202111297094.X, filed on Nov. 4, 2021, entitled "Method for Backbone Node Access and Blockchain System", which are hereby incorporated by reference herein in their entireties.

TECHNICAL FIELD

The disclosure relates to blockchain technology, and for example relates to a method for backbone node access x and a blockchain system.

BACKGROUND

Blockchain technology is a kind of ledger-based technology jointly maintained by multiple parties, which involves multiple technologies such as consensus mechanism, cryptographic algorithms, network routing and contract scripts, and may have advantages for example in distributed trust, tampering resistance and multi-party maintenance, such that the blockchain technology is considered as one of the most revolutionary technologies since the popularity of the Internet, and thus is highly valued all over the world.

A multilayer blockchain network including nodes involves a dynamic access and exit of the nodes. In order to maintain the openness of network governance and the stability of network services, an automatic access mechanism for backbone nodes is needed.

BRIEF SUMMARY

Embodiments of the disclosure disclose a backbone node access method and a blockchain system to implement a dynamic access of a backbone node.

In an aspect of the embodiments of the disclosure, disclosed is a method for backbone node access, comprising:
  receiving, by a first node in a first blockchain system, an access request of a backbone node in a second blockchain system, determining a voting node in the first blockchain system, and requesting the voting node to vote on the access request, the voting node being a super node, and both the first node and the backbone node being blockchain nodes;
  feeding back, by the voting node, a voting result;
  determining, by the first node, a second node from at least one super node of the first blockchain system after determining to approve the access request according to the voting result, and sending anchoring message to the second node, the anchoring message indicating anchoring between the second node and the backbone node; and
  anchoring the second node with the backbone node based on the anchoring message, to enable the backbone node to access the first blockchain system, the second blockchain system to be a slave chain system of the first blockchain system, and the first blockchain system to be a master chain system of the second blockchain system.

In another aspect of the embodiments of the disclosure, disclosed is a blockchain system comprising a first blockchain system and at least one second blockchain system, the first blockchain system comprising a first node and a super node, and the at least one second blockchain system comprising a backbone node.

The first node, the super node and the backbone node may interact according to the method disclosed in any embodiment of the disclosure, so that the backbone node may access the first blockchain system, the second blockchain system including the backbone node may be the slave chain system of the first blockchain system, and the first blockchain system may be the master chain system of the second blockchain system including the backbone node.

Based on the backbone node access method and the blockchain system in the embodiments of the disclosure, the first node of the first blockchain system receives the access request of the backbone node in the second blockchain system, then determines the voting node in the first blockchain system and requests the voting node to vote on the access request. The voting node feeds back the voting result. The first node determines to approve the access request according to the voting result, then determines the second node in the first blockchain system and sends to the second node the anchoring message indicating anchoring between the second node and the backbone node. Then, the second node is anchored with the backbone node based on the anchoring message, to enable the backbone node to access the first blockchain system, the second blockchain system to be the slave chain system of the first blockchain system, and the first blockchain system to be the master chain system of the second blockchain system. The embodiments of the disclosure may, for example, facilitate an effective and safe access of the backbone node, and may also improve security of the slave chain system, where the backbone node is located, after the access.

The embodiments of the disclosure will be described in further detail with reference to the drawings and embodiments.

BRIEF DESCRIPTION OF THE DRAWINGS

The accompanying drawings, which form a part of the specification, illustrate embodiments of the disclosure, and together with the description, serve to explain the principles of the disclosure.

The disclosure may be more clearly understood from the following detailed description with reference to the accompanying drawings. Obviously, the drawings in the following description are only some embodiments of the disclosure. For those of ordinary skilled in the art, other drawings may be obtained according to these drawings without creative labors.

DETAILED DESCRIPTION

Figure 1:
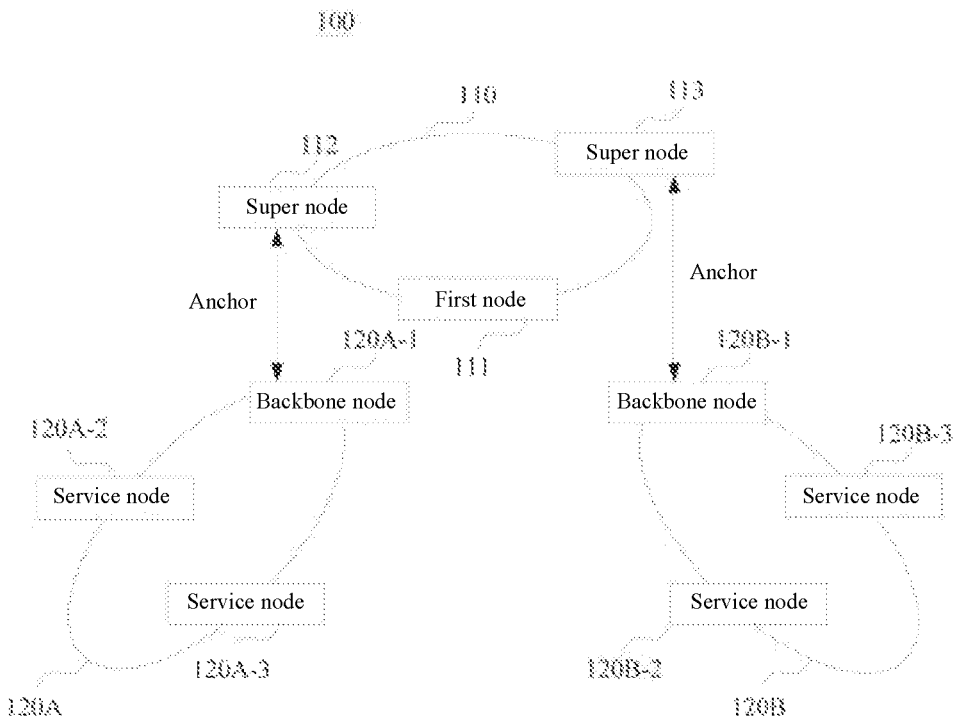
FIG. 1 shows an architecture diagram of a blockchain system according to an embodiment of the disclosure.

Various exemplary embodiments of the disclosure will now be described in detail with reference to the accompanying drawings. It is noted that the relative arrangement, numerical expressions and numerical values of components and steps set forth in these embodiments do not limit the scope of the disclosure unless otherwise specified.

It is also understood that, in the embodiments of the disclosure, "a plurality of" may refer to two or more, and "at least one" may refer to one, two, or more.

It may be understood by those skilled in the art that terms such as "first" and "second" in the embodiments of this disclosure are only used to distinguish different steps, devices or modules, and do not represent any specific technical meaning or their inevitable logical order.

It is also understood that any component, data or structure mentioned in the embodiments of the disclosure can generally be understood as one or more components, data or structures unless explicitly defined or given contrary enlightenment in the context.

It is also understood that the description of various embodiments in this disclosure focuses on the differences between various embodiments, and the same or similar parts may serve as references for each other, and will not be repeated for the sake of brevity.

The description of at least one exemplary embodiment below is only illustrative, and in no way should it be taken as any limitation on the disclosure, its application or uses.

Technologies, methods and apparatuses known to ordinary skilled in related fields may not be discussed in detail, but in appropriate cases, may be regarded as part of the specification.

It is noted that similar reference numerals and letters indicate similar items in the following figures, so if an item is defined in one figure, further discussion for it may be omitted in the following figures.

In addition, the term "and/or" herein is only an association relationship describing the associated objects, which means that there may be three kinds of relationships. For example, A and/or B may mean A alone, A and B, and B alone. In addition, the character "/" herein generally indicates that the two associated objects are in an "or" relationship.

The embodiments of the disclosure may be applied to electronic apparatuses such as terminal apparatuses, computer systems, servers, and the like, which may be operated together with many other general-purpose or special-purpose computing system environments or configurations. Examples of well-known terminal apparatuses, computing systems, environments and/or configurations suitable for use with terminal apparatuses, computer systems, servers and other electronic equipment include, but are not limited to, personal computer systems, server computer systems, thin clients, thick clients, handheld or laptop equipment, microprocessor-based systems, set-top boxes, programmable consumer electronics, network personal computers, small computer systems, mainframe computer systems and distributed cloud computing technology environments including any of the above systems.

Terminal apparatuses, computer systems, servers and other electronic apparatuses may be described in the general context of computer system executable instructions (such as program modules) executed by computer systems. Generally, program modules may include routines, programs, object programs, components, logic, data structures, etc., which perform particular tasks or implement particular abstract data types. Computer systems/servers may be implemented in a distributed cloud computing environment where tasks are performed by remote processing apparatuses linked via a communication network. In the distributed cloud computing environment, program modules may be located on local or remote computing system storage media including storage apparatuses.

A multilayer blockchain network including nodes involves a dynamic access and exit of the nodes. In order to maintain the openness of network governance and the stability of network services, an automatic generation for backbone nodes is needed.

On this basis, a backbone node generation method is disclosed, so that a backbone node in a second blockchain system may access a first blockchain system, the second blockchain system where the backbone node is located may become a slave chain system of the first blockchain system, and the first blockchain system may become a master chain system of the second blockchain system where the backbone node is located. The details of the method is described below.

Refer to FIG. 1, which shows an architecture diagram of a blockchain system 100 according to an embodiment of the disclosure. The blockchain system 100 is of a master-slave chain structure, that is, a "1+N" master-slave chain architecture. For example, as shown in FIG. 1, the blockchain system comprises a first blockchain system 110 and at least one second blockchain system such as 120A and 120B. In detail, the first blockchain system comprises a first node and more than one super node. For example, the first blockchain system 110 shown in FIG. 1 comprises a first node 111, a super node 112, and a super node 113. Each second blockchain system comprises a backbone node and at least one service node. For example, in the scenario shown in FIG. 1, the second blockchain system 120A comprises a backbone node 120A-1, a service node 120A-2, and a service node 120A-3, and the second blockchain system 120B comprises a backbone node 120B-1, a service node 120B-2, and a service node 120B-3.

The backbone node of the second blockchain may be anchored with a super node of the first blockchain system, so that the backbone node may access the first blockchain system, the second blockchain system may become a slave chain system of the first blockchain system, and the first blockchain system may become a master chain system of the second blockchain system. Accordingly, a blockchain generated by the master chain system may be called a master chain, and any blockchain generated by the slave chain system may be regarded as a slave chain.

Super nodes anchored with different backbone nodes are different. The backbone node may be configured to synchronize data of its slave chain system with a supervisory node of the master chain system. The slave chain system performs cross-chain interaction with the master chain system through the backbone node. Different slave chain systems may comprise different backbone nodes, or at least two slave chain systems may share one backbone node. Any two slave chain systems may have the same structure, or different structures.

1. Master Chain System

For the master chain system, i.e. the first blockchain system, its basic functions may include ensuring the efficient operation of a chain group, and its service functions may provide protection for healthy development of the entire chain group ecosystem, for example, to provide public services for the entire chain group structure and facilitate the vigorous development of the ecology, to provide cross-chain trading platforms and specifications for each blockchain to promote data sharing and integration, to provide hosting services for various industries to ensure that data cannot be tampered with and may be recovered, to provide trusted authentication to ensure the cross-domain credibility of nodes and data thereof and allow nodes with authentication rights to provide authentication services for nodes or identifiers, to provide supervision services and safety monitoring services for each blockchain to ensure the legality and compliance and operational safety of each node in the entire chain group structure, and to make application services of the master chain open to the outside so that service nodes may freely access or exit the master chain to enjoy the open services provided by the master chain, so as to promote the improvement of enterprise capabilities.

The master chain system may comprise a plurality of super nodes and one supervisory node.

(1) Super Node

The super node may be configured to perform the consensus of the master chain system, and may also be configured to perform data hosting, cross-chain gateway, qualification examination, chain group management and so on. The super node may be configured to provide a trusted computing environment and to run oracle machine services based on trusted computing hardware. The super node may obtain external data and provide trusted data services after a verification.

Each node in the chain group may apply to be a super node candidate and may have the right to be elected as a super node.

The super node may be configured to construct a node group, and to manage the data synchronization rights for the freely accessed service nodes, so as to improve the overall service capacity of the master chain system.

(2) Supervisory Node

The supervisory node may be configured to perform a legal and compliance supervision for the data and behaviors of users and nodes in the whole chain group, and to deal with illegal behaviors, for example, by shutting down services, restricting permissions, controlling traffic, and marking untrusted users. Besides, the supervisory node may conduct qualification examination and trusted authentication on the nodes with management rights, such as the super node and the backbone node, to ensure the credibility of key nodes.

In the embodiments of the disclosure, the master chain system may have basic functions and service functions. The basic functions may include but are not limited to: pluggable architecture, high-performance consensus mechanism, highly reliable smart contract, privacy protection, encryption mechanism, self-governance, isomorphic and heterogeneous link access, and incentive mechanism. The service functions may include but are not limited to: digital identity, trusted authentication service, multi-identifier root zone management, identifier registration and analysis, hosting service, public service, interface service and cross-chain.

In addition to the above basic functions and service functions, the functions of the supervisory node may also include but are not limited to: data content supervision, node behavior supervision, super node qualification examination, backbone node qualification examination, application violation handling, node violation handling, super node authentication and backbone node authentication.

In addition to the above basic functions and service functions, the functions of the super node may also include but are not limited to: public data management, user/node identity authentication, external public service, node group construction and management, slave chain access authentication, chain group management, contract management, trusted computing environment, big data analysis, operation monitoring, master chain consensus, cross-chain gateway, trusted data service and oracle service based on trusted hardware.

By the supervisory node and super nodes of the master chain, interactive platform sharing, monitoring and supervision services, equal cooperation and governance, and ecological construction and operation may be realized.

2. Slave Chain System

The slave chain system may be the second blockchain system, basic functions of which may include ensuring the efficient operation of the slave chain system under the backbone node, and service function of which may include providing guarantee for the normal development of business of the slave chain system and the benign development of industrial ecology. For example, according to different business scenarios, the slave chain may support personalized business activities and may also support an independent implementation of consensus.

The second blockchain system accesses the first blockchain system. The second blockchain system may become the slave chain system of the first blockchain system for example by: (1) creating an isomorphic second blockchain system based on the first blockchain system, for example by creating an isomorphic slave chain system based on the master chain system; and/or (2) by developing, by the second blockchain system according to the interface specification of the first blockchain system, an interface to access the first blockchain system, for example, the slave chain system may develop an interface according to the interface specification of the master chain system, to access the master chain system.

The slave chain system is required to submit an application to the master chain system for the access and may be connected to the master chain system through the backbone node.

The slave chain system may use the public services or resources of the whole chain group, and may also deploy personalized applications or smart contracts as required. For example, different data query rights may be opened for the backbone node according to the trust level of the backbone node, so that backbone nodes with different trust levels may subscribe to different services from the master chain system.

The slave chain system may be a basic slave chain system, a regional slave chain system, or an industrial slave chain system, etc.

In the embodiments of the disclosure, the slave chain system may comprise a backbone node and a plurality of service nodes.

(1) Backbone Node

The backbone node may be configured to perform functions such as master chain system anchoring, slave chain system consensus, slave chain system supervision, smart contract deployment and so on.

The supervision includes that the supervisory node of the master chain system appoints a local supervision department to participate in supervision activities.

The slave chain system may perform cross-chain interactions with the master chain system through the backbone node of the slave chain system.

Multiple slave chain systems may share one backbone node, or each of multiple slave chain systems may comprise a backbone node.

(2) Service Node

The service node performs business activities, and the rights of which are uniformly assigned and managed by the backbone node.

In addition, the slave chain system may further comprise a consensus node configured only to perform a consensus.

In the embodiments of the disclosure, the slave chain system may also have basic functions and service functions. The basic functions may include, but are not limited to: pluggable architecture, high-performance consensus mechanism, highly reliable smart contract, privacy protection, encryption mechanism, self-governance, master chain interconnection and incentive mechanism. The service functions may include, but are not limited to: digital identity, trusted authentication service, multi-identifier fusion management, identifier registration and analysis, personalized customization service, external service, interface service and cross-chain.

In addition to the above-mentioned basic functions and service functions, the functions of the backbone node may also include but are not limited to: master chain system anchoring, slave chain system management, node rights management in the slave chain system, slave chain system consensus, external service supply, smart contract customization, pluggable component configuration, and chain group voting.

In addition to the above-mentioned basic functions and service functions, the functions of the consensus node may also include but are not limited to: smart contract customization, slave chain system data synchronization, external service supply, slave chain consensus, specific business activity execution and chain group voting.

In addition to the above-mentioned basic functions and service functions, the functions of the service node may also include but are not limited to: chain group voting, slave chain data synchronization, smart contract customization, external public service supply, chain group public service usage, and specific business activity execution.

Based on the backbone node, the consensus node and the service node of the slave chain system, business autonomy, independent consensus, service customization and public resource sharing may be realized.

Figure 2:
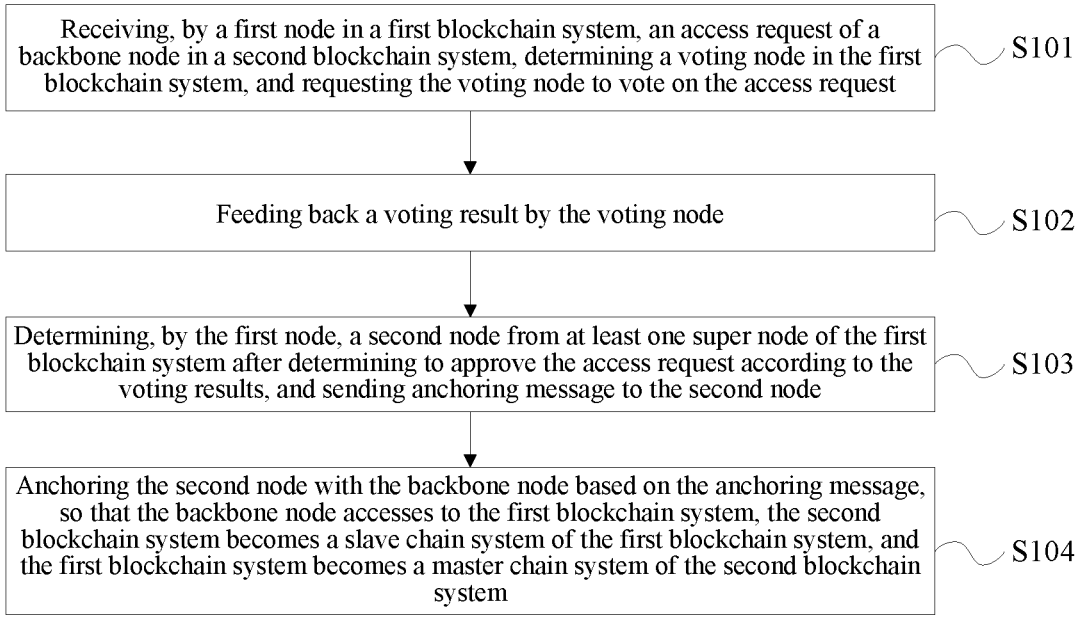
FIG. 2 shows a flowchart of a backbone node access method according to an embodiment of the disclosure.

Refer to FIG. 2 which shows a flowchart of a backbone node access method according to an embodiment of the disclosure, and the method may be applied to the blockchain system 100 shown in FIG. 1. The steps of the method are described below.

In S101, a first node in a first blockchain system may receive an access request from a backbone node in a second blockchain system, determine a voting node in the first blockchain system and request the voting node to vote on the access request, wherein the voting node may be a super node, and both the first node and the backbone node may be blockchain nodes.

The backbone node may be a backbone node which has not accessed to the first blockchain system 110, and may be located in any second blockchain system. For example, as shown in FIG. 1, a backbone node 120A-1 in the second blockchain system 120A may send an access request to the first node 111 of the first blockchain system 110 when accessing to the first blockchain system 110. The first node 111 may call a voting node list of the first blockchain system 110 when receiving the access request, to determine the voting node in the first blockchain system 110. For example, each voting node in this embodiment may be a super node. Then, the first node may initiate a voting request to the voting nodes, so that each voting node may feed back a respective voting result on the access request.

In an example of the disclosure, S101 may be executed by the first blockchain system in the blockchain system.

In S102, the voting node may feed back the voting result.

In response to the voting request initiated by the first node, the voting node may provide the voting result with respect to the access request, which may be directly or indirectly fed back to the first node.

In an example of the disclosure, S102 may be performed by the first blockchain system in the blockchain system.

In S103, the first node may determine a second node from at least one super node of the first blockchain system after determining to approve the access request according to the voting result, and may send anchoring message to the second node, wherein the anchoring message indicates that the second node is anchored with the backbone node.

The second node may be a super node in the first blockchain system to be anchored with the backbone node.

In an optional implementation, the first node may determine whether to approve the access request based on the voting result after obtaining the voting result.

In another optional implementation, the first node may determine whether to approve the access request based on the voting result obtained within a preset period of time after initiating the voting request. In other words, a voting node may be regarded as a waiver in a case where it does not feed back a voting result within a preset period time. It is understood that the preset period of time herein may be regarded as a voting time window for the access request.

After determining to approve the access request, the first node may select a super node from at least one super node in the first blockchain system as the second node, and may send anchoring message to the second node, wherein the anchoring message may include node information of the second node, node information of the backbone node, and an instruction indicating anchoring.

In an example of the disclosure, S103 may be performed by the first blockchain system in the blockchain system.

In S104, the second node may be anchored with the backbone node based on the anchoring message, so that the backbone node accesses the first blockchain system, the second blockchain system becomes a slave chain system of the first blockchain system, and the first blockchain system becomes a master chain system of the second blockchain system.

In an implementation, the second node may determine based on the anchoring message that the nodes participating in the anchoring include the second node and the backbone node, so that the second node is anchored with the backbone node. It is understood that the anchoring herein may mean that the second node synchronizes a local ledger to the backbone node. In an example, publicly available data in a genesis block and subsequent blocks in the local ledger may be synchronized to the backbone node, which is not limited by the embodiment.

After the backbone node is anchored with the second node, that is, after the second node synchronizes the local ledger to the backbone node, the backbone node becomes a blockchain node in the first blockchain system. In other words, the backbone node successfully accesses to the first blockchain system. In this case, the second blockchain system where the backbone node is located becomes the slave chain system of the first blockchain system, and the first blockchain system becomes the master chain system of the second blockchain system where the backbone node is located.

It is noted that the steps performed by the first node and the voting node in the flow shown in FIG. 2 may be realized by smart contracts, and the smart contracts herein may be released and activated by a supervisory node in the first blockchain system.

By the method shown in FIG. 2, the backbone node may effectively and safely access to the master chain system, and also, security after the access may be ensured for the slave chain system where the backbone node is located.

In an example of the disclosure, S104 may be performed by the first blockchain system in the blockchain system.

Figure 3:
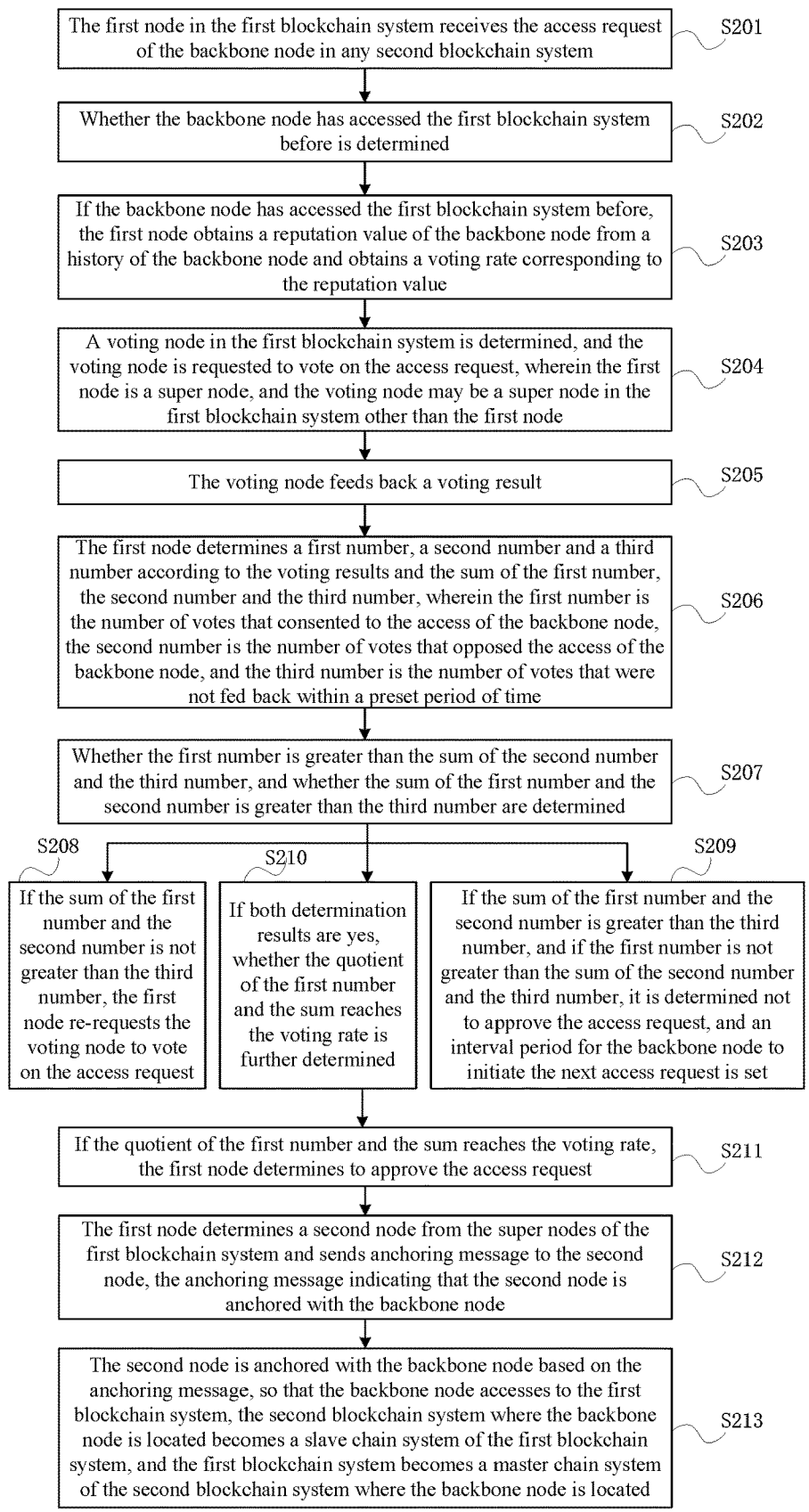
FIG. 3 shows a flowchart of another backbone node access method according to an embodiment of the disclosure.

Referring back to FIG. 1, in an implementation, the first node may be a super node in the first blockchain system. For example, the first node 111 shown in FIG. 1 may be a super node. In this way, after receiving the access request from the backbone node, the first node 111 may participate in voting on the access request together with the super nodes 112 and 113. An example flow of the backbone node access method according to an embodiment of the disclosure is described below in combination with this scenario, and the backbone node access method may comprise the steps shown in FIG. 3.

In S201, the first node in the first blockchain system may receive the access request from the backbone node in the second blockchain system.

In an implementation of this embodiment, the first node 111 may be any super node in the first blockchain system. In another implementation of this embodiment, considering that each super node in the first blockchain system may have a corresponding production time period, each super node may be responsible for block packaging within the corresponding production time period. Therefore, the first node 111 may be a super node in the first blockchain system, which is responsible for block packaging in the current production time period.

Optionally, the access request may comprise fields such as a node type (Node_type), a node owner (Node_owner), a node ID (Node_ID), an account address (Address), an IP address, a public key, a signature. The values of the aforementioned fields may be of a string type. The node type may be a type of the backbone node that sends the access request, the node owner may be identity information on an owner of the backbone node that sends the access request. For example, the owner herein may be an enterprise, and accordingly, the corresponding value of the node owner may be an enterprise code or organization code of the enterprise. The node ID may be the ID of the backbone node that sends the access request, and the account address may be a blockchain account address of the backbone node.

In an embodiment, the receiving the access request by the first node may be implemented by refer to the above description with respect to S101, which is not repeated here.

In an example of the disclosure, S201 may be performed by the first blockchain system in the blockchain system.

In S202, it may be determined whether the backbone node sending the access request accessed to the first blockchain system ever.

In this embodiment, different access conditions may be set for a backbone node accessing to the first blockchain system for the first time and a backbone node not accessing to the first blockchain system for the first time, and the latter refers to a backbone node that successfully accessed to the first blockchain system ever and then exited.

For example, a first backbone node list and a second backbone node list may be maintained in the first blockchain system. In a case where a backbone node (for example, the backbone node 120A-1) has successfully accessed to the first blockchain system, the node information on the backbone node 120A-1 may be added to the first backbone node list. When a backbone node (for example, the backbone node 120A-1) exits the first blockchain system, the node information on the backbone node 120A-1 may be searched for in the first backbone node list. If the information is found, the node information on the backbone node 120A-1 may be deleted from the first backbone node list and may be added to the second backbone node list. The node information herein may include identity information on the node, such as an IP address and/or a public key.

It may be understood that, in order to reduce the data volume of the second backbone node list, data in the second backbone node list may be cleaned regularly, for example, by cleaning the node information with an adding time satisfying a condition from the second backbone node list every other first cycle. For example, the condition herein may be an interval between the adding time and a current time being greater than a second cycle which is greater than the first cycle. For example, the first cycle may be one week, and the second cycle may be one month, so that the node information added in the second backbone node list one month ago is cleaned every other week.

In S202, the first node nay access to the second backbone node list to determine whether the node information on a sending node of the currently received access request is in the second backbone node list: if so, it is determined that the sending node (i.e., the backbone node to access to the first blockchain system) has accessed to the first blockchain system before; otherwise, the first backbone node list may be searched for, and if the node information on the sending node is not in the first backbone node list neither, it is determined that the sending node has not accessed to the first blockchain system before.

In an example of the disclosure, S202 may be performed by the first blockchain system in the blockchain system.

In S203, if the backbone node sending the access request has accessed to the first blockchain system before, the first node may obtain a reputation value of the backbone node sending the access request from a history of the backbone node, and may obtain a voting rate corresponding to the reputation value.

In this embodiment, for a backbone node that has accessed to the first blockchain system before, the node information of the backbone node may also include the reputation value of the backbone node. In other words, the reputation value of the backbone node that accessed to the first blockchain system and then exited may be stored in the second backbone node list as a part of the node information.

In this embodiment, the reputation value of a backbone node may be calculated in different ways.

In an embodiment, the reputation value of a backbone node may be calculated based on an active rate a, a reported rate v, and an overtime response rate r of the backbone node. For example, the reputation value may be obtained by weighted summation of the active rate a, the reported rate v, and the overtime response rate r of the backbone node, wherein, for example, the weight of the active rate a is 1, the weights of the reported rate v and the overtime response rate r are both negative, and the sum of the weights of the reported rate v and the overtime response rate r is −1, for example, the weight of the reported rate v is −0.4 and the weight of the overtime response rate r is −0.6. In this case, the calculation formula of the reputation value may be:

$$\text{Reputation value} = a - 0.6v - 0.4r,$$

wherein a represents the active rate, v represents the reported rate, and r represents the overtime response rate.

Optionally, a=transaction submission times/total super node consensus times, and the transaction submission times may be a number of transactions submitted by the backbone node in the first blockchain system. In the first blockchain system, multiple rounds of consensus may be initiated, and the super node may act as the voting node to vote to determine whether a consensus is reached. Correspondingly, the total super node consensus times may be a total number of rounds of consensus reached by the super node in the first blockchain system.

Optionally, v=reported times/total reported times, wherein the reported times may be a number of reported times of the backbone node, and the total reported times may be a sum of the numbers of reported times of all nodes in the first blockchain system. It may be understood that a smart contract for recording and processing report information may be deployed in the first blockchain system.

Optionally, r=overtime response times/total overtime response times, wherein the overtime response times may be a number of overtime response times of the backbone node, and the total overtime response times may be a sum of the numbers of overtime response times of all blockchain nodes in the first blockchain system.

Optionally, a correspondence between the reputation value and the voting rate may also be set in the first blockchain system, which, for example, may be saved in a ledger or on a supervisory node. The correspondence between the reputation value and the voting rate may be set as needed. For example, the correspondence between the reputation grade and the voting rate may be set, so that the voting rate corresponding to the reputation value may be determined according to the reputation grade to which the reputation value belongs.

Based on the above expression of the reputation value, it may be determined that the value is in a range of [−1, 1]. In an example, four reputation grades of the reputation value may be determined according to values of the reputation value, for example excellent, good, medium, and poor. For example, if the reputation value is in a range of [−1, 0], it may be determined that the reputation grade of the reputation value is poor (or unqualified): if the reputation value is in a range of (0, 0.3], it may be determined that the reputation grade of the reputation value is medium: if the reputation value is in a range of (0, 0.6], it may be determined that the reputation grade of the reputation value is good; and if the reputation value is in a range of (0.6, 1), it may be determined that the reputation grade of the reputation value is excellent. It may be understood that the aforementioned numbers of reputation grades and setting conditions for each reputation grade are only examples, and are not used to limit the protection scope of this disclosure.

The voting rate corresponding to a poor reputation grade may be 100%. In other words, if a backbone node, which accessed to the first blockchain system and then exited, has a poor reputation grade, it is required to obtain consent from all voting nodes to access to the first blockchain system successfully when requesting to access to the first blockchain system again.

The voting rate corresponding to a medium reputation grade may be 60%. In other words, if a backbone node, which accessed to the first blockchain system before and then exited, has a medium reputation grade, it is required to obtain consent from 60% voting nodes to access to the first blockchain system successfully when requesting to access to the first blockchain system again. In addition, the voting rate corresponding to a good reputation grade may be 50%, and the voting rate corresponding to an excellent reputation grade may be 50%. Further, when a backbone node with an excellent reputation grade applies to access to the first blockchain system again, the voting time for the access request (for example, the preset period of time mentioned above) may be increased, for example, may be doubled.

It may be understood that the above-mentioned voting rates and additional conditions corresponding to various reputation grades are only examples, and are not used to limit the protection scope of this disclosure.

In another implementation, the reputation value of the backbone node may be obtained by the following formula:

$$\text{Reputation value} = \text{bytes\_sent}/(\text{bytes\_down} + 1).$$

The reputation value may also be called a sharing rate, where bytes_sent may represent a transaction volume submitted by the backbone node to the first blockchain system (i.e. the master chain system), and bytes_down may represent a transaction volume downloaded by the backbone node from the first blockchain system. When the backbone node only accepts data and does not submit transactions, the reputation value may plummet.

In this case, after accessing to the first blockchain system and then exiting, the voting rate P of a secondary access may be obtained by the following expression:

$$P = 1 - 1/(1 + e^{6-3b})$$

where b represents the reputation value. It can be seen that when b decreases, the voting rate P of the secondary access also decrease.

Optionally, if the backbone node has not accessed the first blockchain system before, S204-S209 described below may be directly executed. When the two determination results in S207 are both yes, the first node may determine to approve the access request and further execute S212-S213 described below.

In an example of the disclosure, S203 may be performed by the first blockchain system in the blockchain system.

In S204, a voting node in the first blockchain system may be determined, and may be requested to vote on the access request, wherein the first node is a super node, and the voting node may be a super node in the first blockchain system other than the first node.

In an example of the disclosure, S204 may be performed by the first blockchain system in the blockchain system.

In S205, the voting node may feed back a voting result.

In the embodiment, at least a part (that is, part or all) of super nodes in the first blockchain system other than the first node may be determined as voting nodes. In this case, after receiving the access request, the first node may forward the access request to the determined voting nodes, so that the voting nodes may feed back the voting results for the access request. Correspondingly, the voting results fed back by the voting nodes may be directly fed back to the first node.

In the embodiment of the disclosure, the first node determines whether to approve the access request according to the obtained voting results, which may be implemented by S203-S210.

In an example of the disclosure, S205 may be performed by the first blockchain system in the blockchain system.

In S206, the first node may determine a first number, a second number, and a third number, according to the obtained voting results, and determine a sum of the first number, the second number and the third number, wherein the first number is a number of votes in the voting results that consented to the access of the backbone node, the second number is a number of votes in the voting results that opposed the access of the backbone node, and the third number is a number of votes in the voting results that were not fed back within a preset duration (i.e., a number of voting nodes that abstained).

The sum of the first number, the second number and the third number may represent a number of all nodes participating in the voting.

In an example of the disclosure, S206 may be performed by the first blockchain system in the blockchain system.

In S207, whether the first number is greater than the sum of the second number and the third number, and whether the sum of the first number and the second number is greater than the third number are determined.

In an example of the disclosure, S207 may be performed by the first blockchain system in the blockchain system.

In S208, if the sum of the first number and the second number is not greater than the third number, the first node may re-request the voting node to vote on the access request.

In the embodiment, if the number of voting nodes that abstained is too large, for example, when the number of voting nodes that abstained is greater than the number of voting nodes that did not abstain, that is, when the number of voting nodes that abstained is greater than a sum of the number of voting results indicating consent and the number of voting results indicating opposition, a new round of voting may be initiated.

In an example of the disclosure, S208 may be performed by the first blockchain system in the blockchain system.

In S209, if the sum of the first number and the second number is greater than the third number, and if the first number is not greater than the sum of the second number and the third number, it is determined not to approve the access request, and an interval cycle for the backbone node to initiate the next access request may be set.

The sum of the first number and the second number being greater than the third number means that the number of voting nodes that abstained is small, in other words, the number of voting nodes that did not abstain meets the requirements. Meanwhile, if the number of voting results indicating consent does not exceed the sum of the number of voting results indicating opposition and the number of voting nodes that abstained, it may be determined that the access request is not approved. Optionally, at this point, the time condition for the backbone node sending the access request (i.e., the current applicant) to initiate the next access request can also be set, for example, the interval period can be set, and only an access request retransmitted by the current applicant after this interval cycle may be processed.

In an example of the disclosure, S209 may be performed by the first blockchain system in the blockchain system.

In S210, if the first number is greater than the sum of the second number and the third number, and the sum of the first number and the second number is greater than the third number, it may be further determined whether a quotient of the first number and the sum reaches the voting rate.

In an example of the disclosure, S210 may be performed by the first blockchain system in the blockchain system.

In S211, if the quotient of the first number and the sum reaches the voting rate, the first node may determine to approve the access request.

In the embodiment, when the number of voting nodes that did not abstain meets the requirements, and the number of voting results indicating consent also meets the requirements, if the current applicant is a backbone node that applies for access for the first time, the access request may be directly approved, so as to execute subsequent S212 and S213. If the current applicant is a backbone node which is not a first-time applicant (for example, apply for the second time, the third time or more), whether the voting result of the access request of the current applicant meets the voting rate corresponding to the reputation value of the current applicant is further determined, and if so, it is determined to approve the access request of the current applicant.

In an example of the disclosure, S211 may be performed by the first blockchain system in the blockchain system.

In S212, the first node may determine a second node from the super nodes of the first blockchain system and send an anchoring message to the second node. The anchoring message may indicate that the second node is anchored with the backbone node.

In an example of the disclosure, S212 may be performed by the first blockchain system in the blockchain system.

In S213, the second node may be anchored with the backbone node based on the anchoring message, so that the backbone node accesses to the first blockchain system, the second blockchain system becomes a slave chain system of the first blockchain system, and the first blockchain system becomes a master chain system of the second blockchain system.

In an example of the disclosure, S213 may be performed by the first blockchain system in the blockchain system.

The embodiments of S212 and S213 are similar to S103 and S104 in the previous embodiments which may therefore be used as a reference, and will not be repeated here.

By the backbone node access method according to this embodiment, the backbone node may dynamically access the first blockchain system safely and effectively, so that the second blockchain system becomes the slave chain system of the first blockchain system, and the first blockchain system becomes the master chain system of the second blockchain system. In addition, by restricting the access conditions of backbone nodes which are not first-time applicants, obstacles may be set for some malicious backbone nodes that repeatedly attempt to access the first blockchain system, thus further improving the security of the access process of backbone nodes.

Optionally, in this embodiment, when any backbone node successfully accesses to the first blockchain system and is anchored with the target super node, the target super node may generate a digital identity for the backbone node, and the digital identity may include the following information on the backbone node:

Node_ID: node ID which is globally unique;
Node_type: node type;
Node_owner: node owner;

Account: node account;
IP: IP address of the node;
Publickey: public key of the node;
Key_type: type of the public key;
ChainID: ID of the slave chain system accessed by the backbone node, wherein that the ChainID herein may be one or more, and may be used to provide functions including chain discovery and chain addressing; and
Chain_reputation: a reputation value of the node, which may be modified by the super node, and may be calculated in various calculation manners disclosed above. In addition, considering that the backbone node may access to multiple slave chain systems, the more slave chain systems the backbone node accesses to, the higher its credibility. On this basis, the reputation value of the backbone node may be obtained by the following calculation formula:

Reputation value=(number of slave chain systems accessed by the backbone node)/(number of global slave chain systems).

In this embodiment, the super node may receive report information from an external smart contract about the backbone node, and the reputation value of the backbone node may be updated in a preset way every time a piece of report information about the backbone node is received. The preset way here may be, for example, reducing the reputation value of the backbone node by a preset proportion, or subtracting a preset value from the current reputation value of the backbone node, which is not limited by this embodiment.

Optionally, in this embodiment, when a new slave chain system accesses to the backbone node, the backbone node may trigger a smart contract to update the ChainID in the digital identity of the node. For example, a ChainID of the new slave chain system may be added to the digital identity of the backbone node for other slave chain systems to discover the new slave chain system. Moreover, increasing the ChainID may automatically trigger the update of the reputation value of the backbone node, and an example calculation manner may be as follows:

Reputation value=(number of slave chain systems accessed by the backbone node)/(number of global slave chain systems)−(number of evils committed by the backbone node)/(number of evils committed by the whole network).

Besides, the super node may reject a slave chain system. When a slave chain system is rejected, the ChainID of the slave chain system may be deleted from the digital identity of the backbone node accessed by the slave chain system.

Optionally, in this embodiment, a first smart contract may also be deployed in the first blockchain system. For at least one backbone node that needs to access to the first blockchain system, the backbone node may send a report verification request to the first blockchain system a first time window in advance, and the report verification request may carrying the Node_ID of the backbone node. When any super node of the first blockchain system receives the report verification request, the backbone node corresponding to the Node_ID in the report verification request may be determined as a target backbone node; from the current moment, report information on the target backbone node may be periodically obtained from a preset authoritative server through the first smart contract within the first time window, and the number of pieces of the obtained report information is counted. When the number reaches a preset threshold, the Node_ID of the target backbone node is added to a forbidden list.

Further, when receiving the access request, the super node in the first blockchain system may query whether the Node_ID carried by the access request exists in a forbidden list through the first smart contract, and if not, request the voting node in the first blockchain system to vote on the access request.

Similarly, a second smart contract may be deployed in the first blockchain system, which may be used to, for each backbone node that has accessed to the first blockchain system, obtain report information on the backbone node within a second time window before the current moment from the authority server, and count the number of pieces of the obtained report information. When the number reaches a preset threshold, the backbone node exits the first blockchain system.

It is noted that the first time window and the second time window in this embodiment may be the same or different. The first smart contract and the second smart contract may be the same smart contract or different smart contracts, which is not limited by this embodiment.

Figure 4:
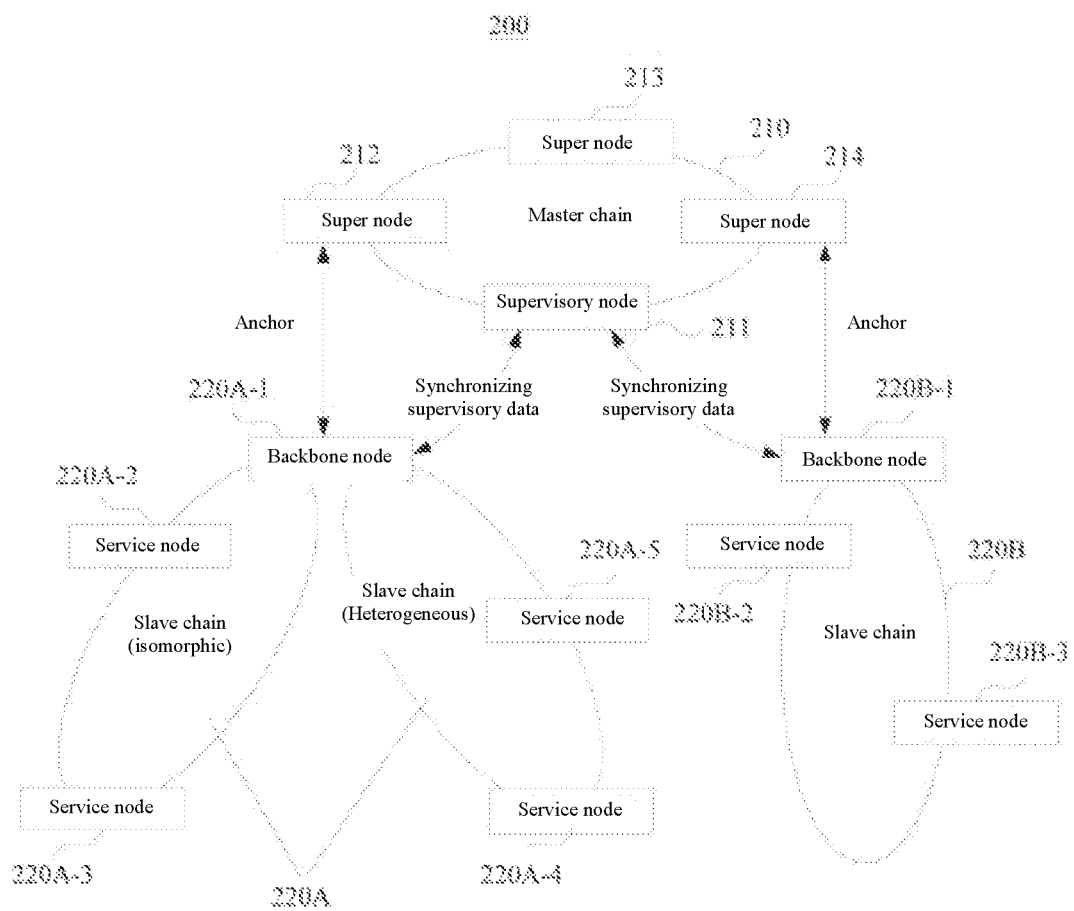
FIG. 4 shows an architecture diagram of another blockchain system according to an embodiment of the disclosure.

Referring again to FIG. 1, in another implementation, the first node may be a supervisory node in the first blockchain system. For example, as shown in FIG. 4, the blockchain system 200 comprises a first blockchain system 210, a second blockchain system 220A and a second blockchain system 220B. The first blockchain system 210 comprises a supervisory node 211, a super node 212, a super node 213 and a super node 214, the second blockchain system 220A comprises a backbone node 220A-1, a service node 220A-2, a service node 220A-3, a service node 220A-4 and a service node 220A-5, and the second blockchain system 220B comprises a backbone node 220B-1, a service node 220B-2 and a service node 220B-3. In this case, when receiving an access request from any backbone node, the first node 211 may forward the access request to the super node serving as the voting node for subsequent voting.

Figure 5:
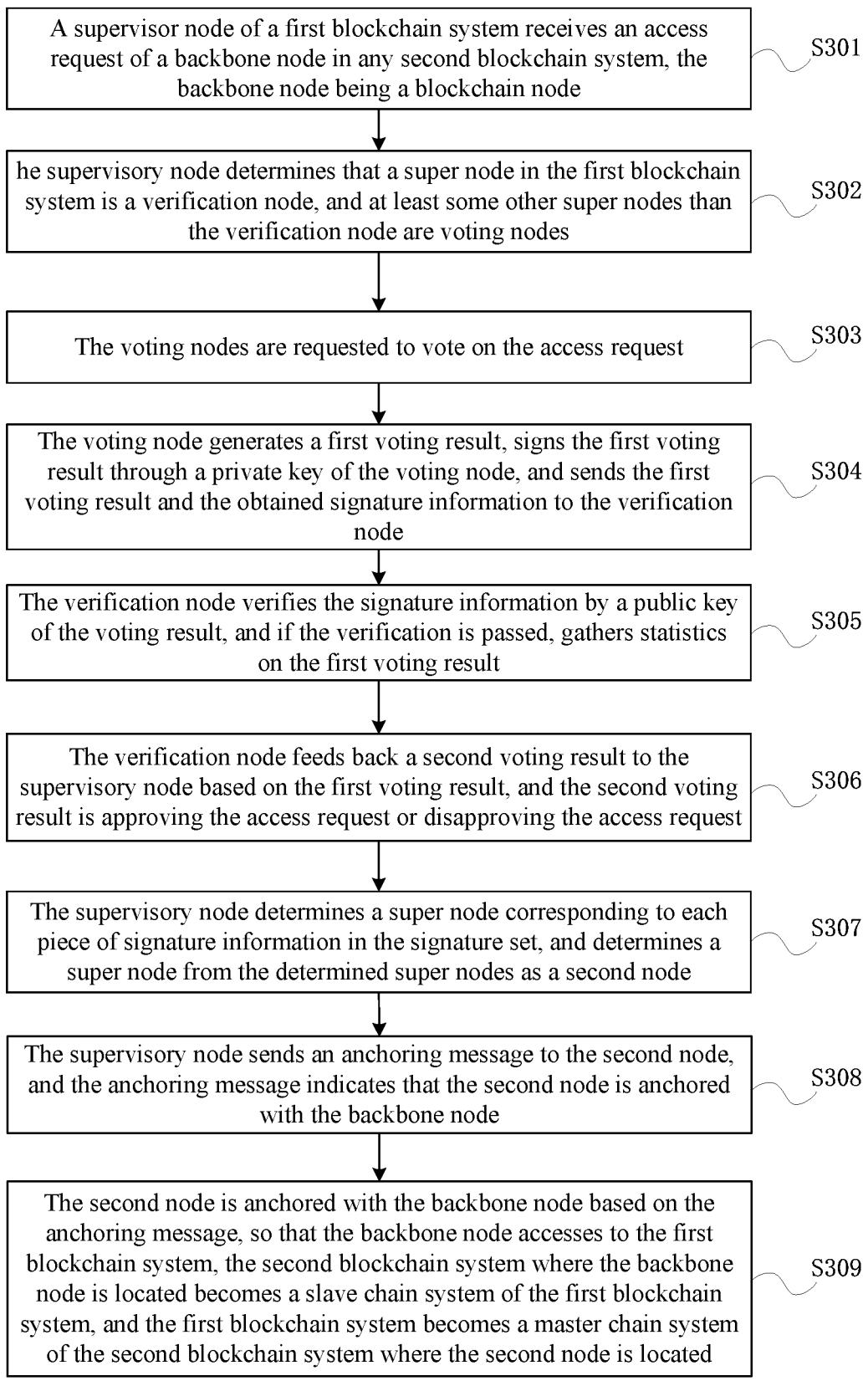
FIG. 5 shows a flowchart of yet another backbone node access method according to an embodiment of the disclosure.

The flow of a backbone node access method according to another embodiment of the disclosure will be described below in combination with a scenario shown in FIG. 4. The method may comprise steps shown in FIG. 5.

In S301, a supervisory node of a first blockchain system may receive an access request from a backbone node in a second blockchain system, for example, the supervisory node may receive an access request from a backbone node in any second blockchain system, and the backbone node may be a blockchain node.

In an example of the disclosure, S301 may be performed by the first blockchain system in the blockchain system.

In S302, the supervisory node may determine a super node in the first blockchain system as a verification node, and at least some super nodes in the first blockchain system other than the verification node as voting nodes.

In this embodiment, the supervisory node may act as the first node. The backbone node is located in a second blockchain system, the first blockchain system comprises a supervisory node and at least one super node, and the voting node may be a super node in the first blockchain system. In an example, one super node in the first blockchain system may be determined as a verification node, and all other super nodes other than the verification node in the first blockchain system may be determined as voting nodes. In another example, one super node in the first blockchain system may be determined as a verification node, and a preset number of super nodes in the first blockchain system other than the verification node may be determined as voting nodes, which is not limited by this embodiment.

In an example of the disclosure, S302 may be performed by the first blockchain system in the blockchain system.

In S303, the voting nodes may be requested to vote on the access request.

In this embodiment, the first blockchain system may perform subsequent anchoring processing in response to the access request. The anchoring processing here may be understood as determining based on the access request whether the backbone node sending the access request (that is, the current applicant) meets the access conditions, and anchoring the current applicant when determining that it meets the access conditions.

The anchoring processing here may involve operations performed by a plurality of blockchain nodes (such as supervisory node, voting nodes, etc.), which may be for example realized by a smart contract deployed on the plurality of blockchain nodes. The smart contract may be used to realize the anchoring of the backbone node, which may be activated by the supervisory node, so as to anchor the backbone node and allow the backbone node to access to a global network through the smart contract. The smart contract stipulates the access conditions of the backbone node and provides an ability to interact with the outside to determine the validity of information submitted by the backbone node. After verification, a voting mechanism may be triggered to initiate voting to other nodes, and voting results may be collected and fed back to the supervisory node.

For example, any super node in the first blockchain system may release the smart contract for deploying the backbone node on the first blockchain system, and the supervisory node may activate the smart contract after deploying the smart contract. Therefore, in this step, after receiving the access request from the backbone node, the supervisory node of the first blockchain system may implement S302 and S303 based on the smart contract, that is, may determine the voting node and request the voting node to vote on the access request.

Optionally, in this embodiment, the access request may include first information, where the first information may include data values of one or more of the following data items: application node type, node authority, application enterprise type (such as government or enterprise), organization code, applicant identity, contact information, public key, parameters and service address. It may be understood that the first information may be the relevant information on the backbone node sending the access request, that is, the relevant information on the backbone node applying to access to the first blockchain system.

Further, the access request may also include the identification information on the super node to be anchored by the backbone node (current applicant).

Then, the voting nodes may feed back the voting results, which may be for example realized by S304-S306 as follows.

In an example of the disclosure, S303 may be performed by the first blockchain system in the blockchain system.

In S304, the voting node may generate a first voting result, sign the first voting result through a private key of the voting node, and send the first voting result and the obtained signature information to the verification node.

In an example of the disclosure, S304 may be performed by the first blockchain system in the blockchain system.

In S305, the verification node may verify the signature information through a public key of the voting result, and if the verification is passed, may gather statistics on the first voting result, for example, may gather statistics the number of votes of each voting option in the first voting result, that is, count the number of votes that consented to the access request of the backbone node, the number of votes that opposed the access request of the backbone node, and the number of votes that were not fed back within a preset period of time.

In this embodiment, the voting result generated by any voting node on the access request may be regarded as the first voting result. The voting node may call the smart contract to verify whether the access request meets the preset access conditions, and then generate the first voting result according to a verification result.

Each blockchain node may have an asymmetric key pair, including a private key and a public key which correspond to each other. As a blockchain node, the voting node may also have a private key and a public key. For example, in order to ensure the security of voting result feedback, after obtaining the first voting result, the voting node may sign the first voting result through the private key of the voting node to obtain signature information. It can be seen that there is a correspondence between the signature information here and the voting node (super node). The voting node may send the signature information and the first voting result to the verification node. The verification node may verify the signature information through the public key of the voting node, and gather statistics on the first voting result corresponding to the signature information if the verification is passed. If the verification is not passed, the first voting result corresponding to the signature information may be not analyzed, or the first voting result corresponding to the signature information may be recorded as invalid.

In an example of the disclosure, S305 may be performed by the first blockchain system in the blockchain system.

In S306, the verification node may feed back a second voting result to the supervisory node based on the first voting result, and the second voting result may be an approval of the access request or a disapproval of the access request.

As mentioned above, the authentication node may be a super node, for example a super node which is not a voting node.

In S306, the first voting result analyzed by the verification node is a first voting result corresponding to verified signature information. It can be understood that the number of first voting results analyzed by the verification node is less than or equal to the number of the voting nodes. In this embodiment, the second voting result may be a voting result finally determined by the verification node based on the analyzed first voting result, which is used to show whether to approve the access request of the backbone node.

In an implementation, in a case where all the voting nodes cast valid votes and all voting results approve the backbone node to access to the first blockchain system, the second voting result fed back by the verification node to the supervisory node is an approval of the access request, otherwise, the second voting result fed back by the verification node to the supervisory node is a disapproval of the access request. In this example, it is equivalent to a preset threshold of 100%.

In an example of the disclosure, S306 may be performed by the first blockchain system in the blockchain system.

Figure 6:
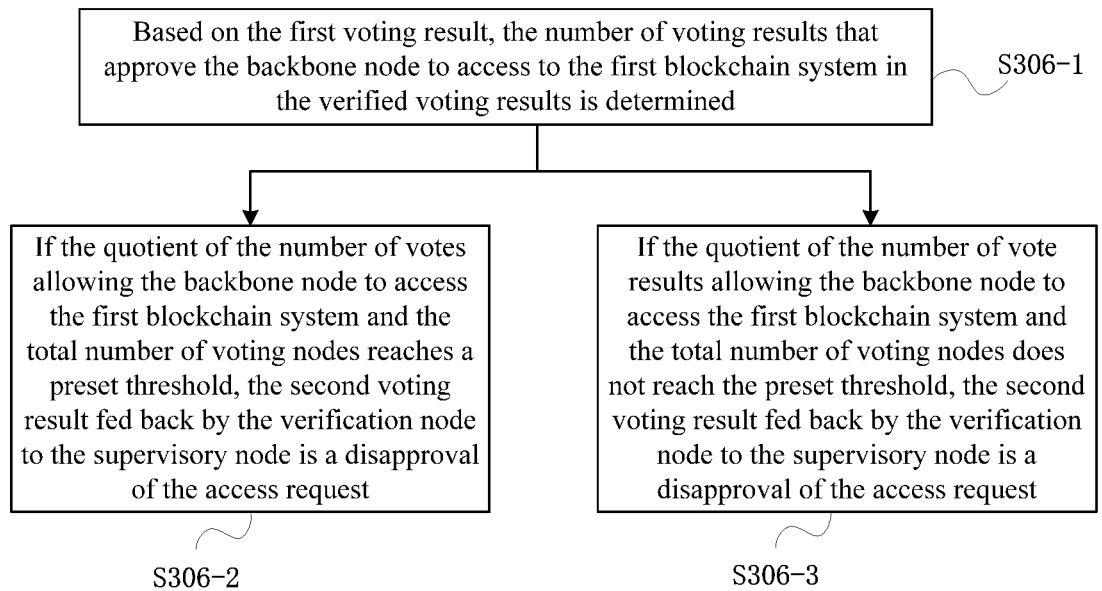
FIG. 6 shows a diagram of the sub-steps of step S306 shown in FIG. 5.

In another implementation, S306 may be realized through the sub-steps shown in FIG. 6.

In S306-1, the number of voting results that approve the backbone node to access to the first blockchain system in the verified voting results is determined based on the first voting result.

The backbone node here may be the current applicant, that is, the backbone node sending the access request.

In an example of the disclosure, S306-1 may be performed by the first blockchain system in the blockchain system.

In S306-2, if the quotient of the number of votes approving the backbone node to access to the first blockchain system and the total number of voting nodes reaches a preset threshold, the second voting result fed back by the verification node to the supervisory node is a approval of the access request.

In an example of the disclosure, S306-2 may be performed by the first blockchain system in the blockchain system.

In S306-3, if the quotient of the number of vote results approving the backbone node to access the first blockchain system and the total number of voting nodes does not reach the preset threshold, the second voting result fed back by the verification node to the supervisory node is a disapproval of the access request.

The preset threshold may be set flexibly as required. For example, it may be any value between 60% and 70%, such as 65%, which is not limited by this embodiment.

In an example of the disclosure, S306-3 may be performed by the first blockchain system in the blockchain system.

In this embodiment, while the verification node is sending the second voting result to the supervisory node, the verification node may also send a verified signature set, that is, a set of verified signature information, to the supervisory node.

In S307, the supervisory node determines a super node corresponding to each piece of signature information in the signature set, and determines a super node as a second node from the determined super nodes.

As mentioned above, each piece of signature information has a correspondence with the voting node, and the voting nodes are all super nodes. Therefore, the supervisory node may determine the super node corresponding to each piece of signature information in the signature set.

If the verification node sends the verified signature set, the supervisory node may determine an anchored super node according to the signature set. For example, a super node corresponding to a signature is selected from the signature set as the anchored super node, that is, the second node. Alternatively, a super node closest to the backbone node (the current applicant) and with signature information in the signature set may be selected as the second node. Alternatively, a super node corresponding to a signature may be selected from the signature set as the second node according to the principle of random election.

It is noted that in some cases, the backbone node may specify a super node to be anchored, and correspondingly, the access request may include target identity information on the super node to be anchored with the backbone node, so a super node indicated by the target identity information in the access request may be taken as the second node. When the access request does not include the target identity information, the second node may be determined as described above, or a super node closest to the backbone node may be directly selected from the super nodes in the first blockchain system as the second node. Alternatively, a super node may be selected from the first blockchain system as the second node according to the principle of random election.

In an example of the disclosure, S307 may be performed by the first blockchain system in the blockchain system.

In S308, the supervisory node sends an anchoring message to the second node, and the anchoring message may indicate that the second node is anchored with the backbone node.

In an example of the disclosure, S308 may be performed by the first blockchain system in the blockchain system.

In S309, the second node may be anchored with the backbone node based on the anchoring message, so that the backbone node accesses to the first blockchain system, the second blockchain system becomes a slave chain system of the first blockchain system, and the first blockchain system becomes a master chain system of the second blockchain system.

It can be understood that the anchoring between any super node and the backbone node in the embodiment of this disclosure may be that the super node synchronizes a ledger in the first blockchain system to the backbone node, so that the backbone node may access to the first blockchain system. In this way, the second blockchain system where the backbone node is located may become the slave chain system of the first blockchain system, and the first blockchain system may become the master chain system of the second blockchain system. By choosing a super node closest to the backbone node to be anchored with the backbone node, the ledger synchronization process may be accelerated and fast anchoring may be realized.

In an example of the disclosure, S309 may be performed by the first blockchain system in the blockchain system.

In addition, after the second node is anchored with the backbone node based on the anchoring message, verification may also be performed.

For example, the second node may generate second information according to node information on the backbone node, and send the second information to the supervisory node.

The data items of the second information may be the same as those of the first information. For example, the first information may include application node type, node authority, application enterprise type, organization code, applicant identity and contact information. In this case, data values in the first information are all data values needed to be added. The second information may also include the application node type, node authority, application enterprise type, organization code, applicant identity and contact information. In this case, data values of the second information are actual data values.

The supervisory node compares the data values of the same data items of the second information and the first information to determine whether they are the same.

If they are the same, it means that the backbone node actually accessing to the first blockchain system and the backbone node about to access to the first blockchain system have the same node information, in other words, the backbone node actually accessing to the first blockchain system and the backbone node about to access to the first blockchain system are the same. Therefore, if the access of the backbone node is correct, the supervisory node may generate a key pair, send the key pair to the backbone node, and transfer the supervision rights of the backbone node to the second node after the second information and the node information of the backbone node are broadcast in the whole network.

The node information of the backbone node of the second blockchain system may be IP address and/or public key information.

It is noted that the above key pair is not sent to the super node. This key pair is used for encryption of data transmission on the slave chain system. Because the backbone node is a node in the slave chain system, the key pair is directly sent to the backbone node, and the super node does not know about the key pair, so the master chain system is unable to see the data content in the slave chain system, thus ensuring data security in the slave chain system.

In addition, in an implementation, after the backbone node of the second blockchain system accesses to the first blockchain system, the supervisory node may also generate a symmetric public key pair and provide the same to the backbone node and a specific super node. The backbone node may use a public key in the symmetric public key pair for encrypted transmission of non-public data, and submit the encrypted non-public data to the first blockchain system. In this case, only the above-mentioned specific super node may view the non-public data, while other backbone nodes or other super nodes cannot view the non-public data. Correspondingly, when the backbone node exits the first blockchain system, the specific super node may abandon the specific public key of the backbone node.

In another implementation, a group symmetric key may be generated by the super nodes in the first blockchain system, and all the super nodes may perform encrypted data transmission through the group symmetric key. For example, taking the scenario shown in FIG. 3 as an example, the super node 213 may encrypt first data to be transmitted to other super nodes (such as 212 and 214) through a group symmetric password to obtain second data; and then, the second data are released in the first blockchain system 210, and the super nodes 212 and 214 that have received the second data may decrypt the second data through the group symmetric key to obtain the first data. However, other blockchain nodes in the first blockchain system cannot decrypt the second data.

Further, when any super node in the first blockchain system exits, or when any super node accesses to the first blockchain system, the group symmetric key may be updated.

Further, when any backbone node accesses to the first blockchain system and is anchored with a super node, the anchored super node may derive an asymmetric key for the backbone node based on the current group symmetric key. The backbone node may encrypt data to be transmitted through the asymmetric key derived by the anchored super node. After receiving data encrypted by the asymmetric key, any super node in the first blockchain system may decrypt the encrypted data sent by the backbone node based on the current group symmetric key. It can be understood that when a super node decrypts the data encrypted by an updated asymmetric key by using a group symmetric key before updating, decryption cannot be done, thus further ensuring the security of data transmission and reducing the risk of information leakage.

Figure 7:
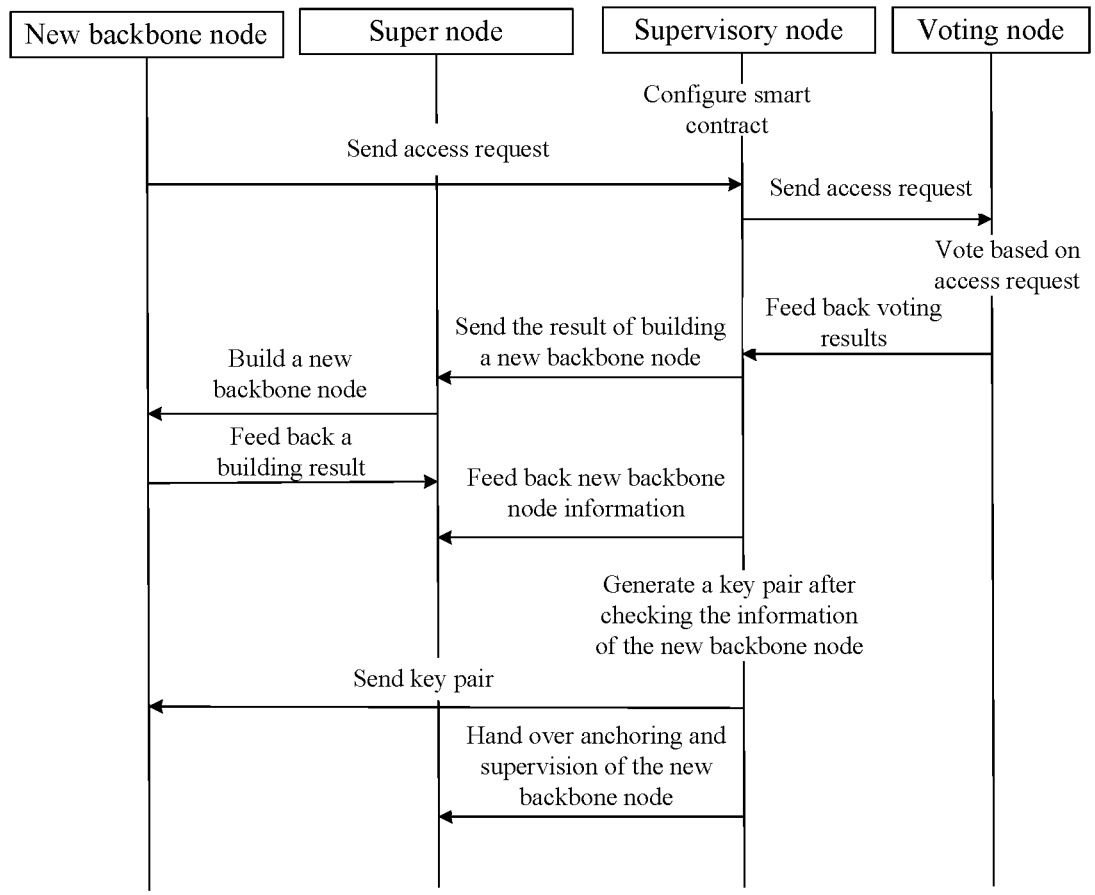
FIG. 7 shows a flowchart of a backbone node access method in an example scenario according to an embodiment of the disclosure.

A backbone node access method according to an embodiment of the disclosure will be further explained by taking FIG. 7 as an example.

1. A smart contract is deployed on a supervisory node of a master chain system.

The smart contract may be issued by any super node on the master chain system and deployed on the supervisory node, and the smart contract is configured to deploy a backbone node.

Only the supervisory node has the authority to activate the smart contract, and then to anchor and build the backbone node.

2. When a node on a slave chain system expects to become the backbone node or in the case of new slave chain system access, an access request is sent to the supervisory node.

3. After receiving the access request, the supervisory node sends the access request to voting nodes so as to vote on the master chain system.

For example, the voting process may be implemented by the voting nodes and a verification node.

The verification node is a super node, and the voting nodes are all super nodes excepting the verification node on the master chain system. Alternatively, the voting nodes are a part of the super nodes other than the verification node in the master chain system.

The voting nodes may be determined by the corresponding deployed smart contract.

(1) The voting node votes on the request to become the backbone node, and adds a signature of the voting node.

For example, the voting node reviews information in the access request of the backbone node, determines whether it meets the rules according to predefined review rules in the smart contract, and votes.

(2) The voting node sends a voting result to the verification node after voting.

The voting node signs the voting result with a private key thereof, and the verification node uses a public key of the voting node to verify whether the signature is correct.

(3) The verification node counts the number of signatures corresponding to voting results indicating consent, and if a ratio of this number to the number of total voting results is greater than a preset threshold (such as 60%), confirmation information is fed back to the supervisory node.

The confirmation information includes but is not limited to: voting result, signature set, website, authority, information capable of being supervised and signature verification information.

4. The supervisory node determines whether the node may become the backbone node, based on the confirmation information fed back by the verification node. If yes, the supervisory node performs signature confirmation and sends the signed information to an anchored super node (the anchored super node may be a super node that the backbone node applies to be anchored with, or a randomly selected super node).

For example, the supervisory node determines whether the backbone node can be generated based on predefined backbone node building criteria in the smart contract and the collected signature information.

The signed information may be a certificate indicating the approval of the request to become the backbone node.

5. The super node builds the backbone node after receiving the confirmation information sent by the supervisory node.

For example, predefined technical performance requirements for backbone node building are provided, and a certificate may be issued after being certified by the anchored super node.

6. After being successfully built, the backbone node sends building success information to the super node.

For example, if it is considered that the backbone node has been successfully built after passing a test of an evaluation organization, the backbone node may send a performance certificate issued by the evaluation organization to the anchored super node.

7. The super node sends the building success information to the supervisory node, and the supervisory node checks the information and generates a key pair if the checking is passed.

The checking is to match the related information of the built backbone node with the related information of the backbone node when applying for building. For example, the related information of the backbone node when applying for building describes how many base stations are physically established, and the building success information also describes how many base stations are physically established. If the numbers are the same, it is considered as a match, otherwise, it is considered as a mismatch.

8. The supervisory node sends the key pair to the backbone node, broadcasts the basic information, IP address and public key information of the backbone node in the whole network, and records them in a ledger.

Here, the above key pair is not sent to the super node. This key pair is used for encryption of data transmission on the slave chain system. Because the backbone node is a node in the slave chain system, the key pair is directly sent to the backbone node, and the super node does not know about the key pair, so the master chain system is unable to see the data content in the slave chain system, thus ensuring the security of slave chain data.

For example, the information for putting on chain may include the following information on the backbone node: node type, identity information of node owner, node ID, account address, IP address, status field, public key, signature, reputation value, reputation value smart contract ID, voting signature, etc. All the information above may be string information.

9. The supervisory node hands over the anchoring and supervision of the backbone node to the super node.

Figure 8:
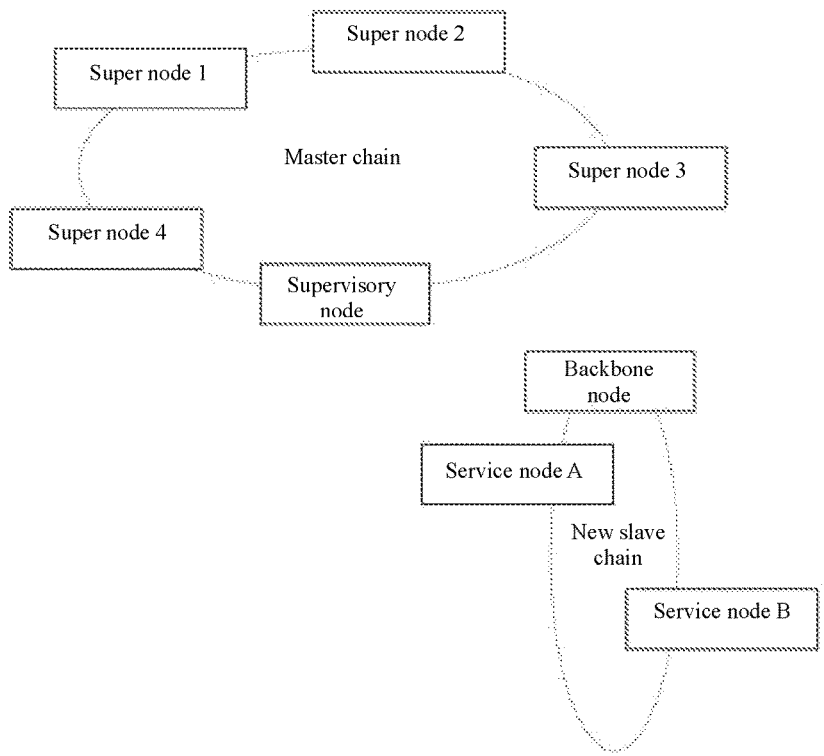
FIG. 8 shows an architecture diagram of a blockchain system before backbone node access by adopting the backbone node access method according to an embodiment of the disclosure.

The method is illustrated below by taking FIG. 8 as an example.

1. A smart contract is deployed on a supervisory node of a master chain system.
2. In the case where a new slave chain system access, a backbone node sends a request to the supervisory node.
3. After receiving the request, the supervisory node sends the request to voting nodes so as to vote on the master chain system.

The voting process may be implemented by the voting nodes and a verification node.

The verification node may be a super node (such as super node 3), and the voting nodes may be all nodes on the master chain system (such as voting node 1, voting node 2 and voting node 4).

(1) The voting node 1, voting node 2 and voting node 4 vote on the request to become the backbone node, and add a signature of the voting node.

(2) The voting node 1, voting node 2 and voting node send voting results to the super node 3 after the voting.

(3) The super node 3 counts the number of signatures corresponding to voting results indicating consent, and if the ratio of this number to the number of total voting results is greater than a preset threshold (such as 60%), confirmation information is fed back to the supervisory node.

4. The supervisory node determines whether the node can become the backbone node based on the confirmation information fed back by the verification node. If yes, the supervisory node performs signature confirmation and sends the signed information to the super node 3.

5. The super node 3 builds the backbone node after receiving the confirmation information sent by the supervisory node.

6. After being successfully built, the backbone node sends building success information to the super node 3.

7. The super node 3 sends the building success information to the supervisory node, and the supervisory node checks the information, and generates a key pair if checking is passed.

8. The supervisory node sends the key pair to the backbone node.

Figure 9:
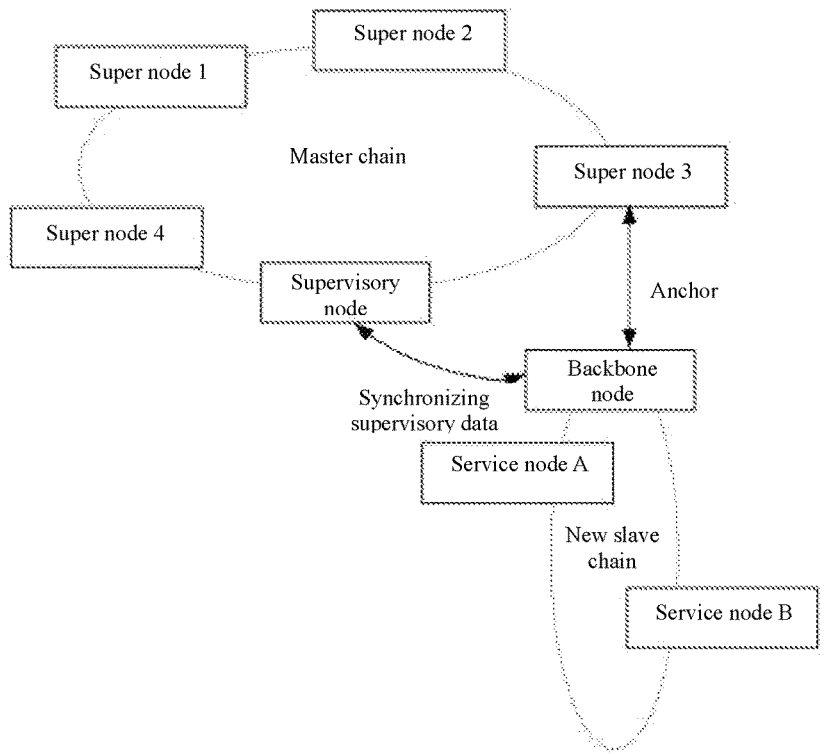
FIG. 9 shows an architecture diagram of a blockchain system after backbone node access by adopting the backbone node access method according to an embodiment of the disclosure.

9. The supervisory node hands over the anchoring and supervision of the backbone node to the super node 3 to form a blockchain system as shown in FIG. 9.

In the method according to this embodiment, the supervisory node of the first blockchain system receives the access request from the backbone node, determines the voting nodes, and requests the voting nodes to vote on the access request, wherein the backbone node is located in the second blockchain system, the first blockchain system comprises a supervisory node and at least one super node, and the voting nodes are super nodes: the voting nodes feed back the voting results to the supervisory node: after determining to approve of the request according to the voting results, the supervisory node determines the anchored super node and sends a message indicating anchoring with the backbone node to the anchored super node; and the anchored super node is anchored with the backbone node based on the message, so that the second blockchain system where the backbone node is located becomes the slave chain system of the first blockchain system, and the first blockchain system becomes the master chain system of the second blockchain system. This method not only ensures the effective and safe generation of the backbone node, but also ensures the safety of the slave chain system where the backbone node is located after generation.

Figure 10:
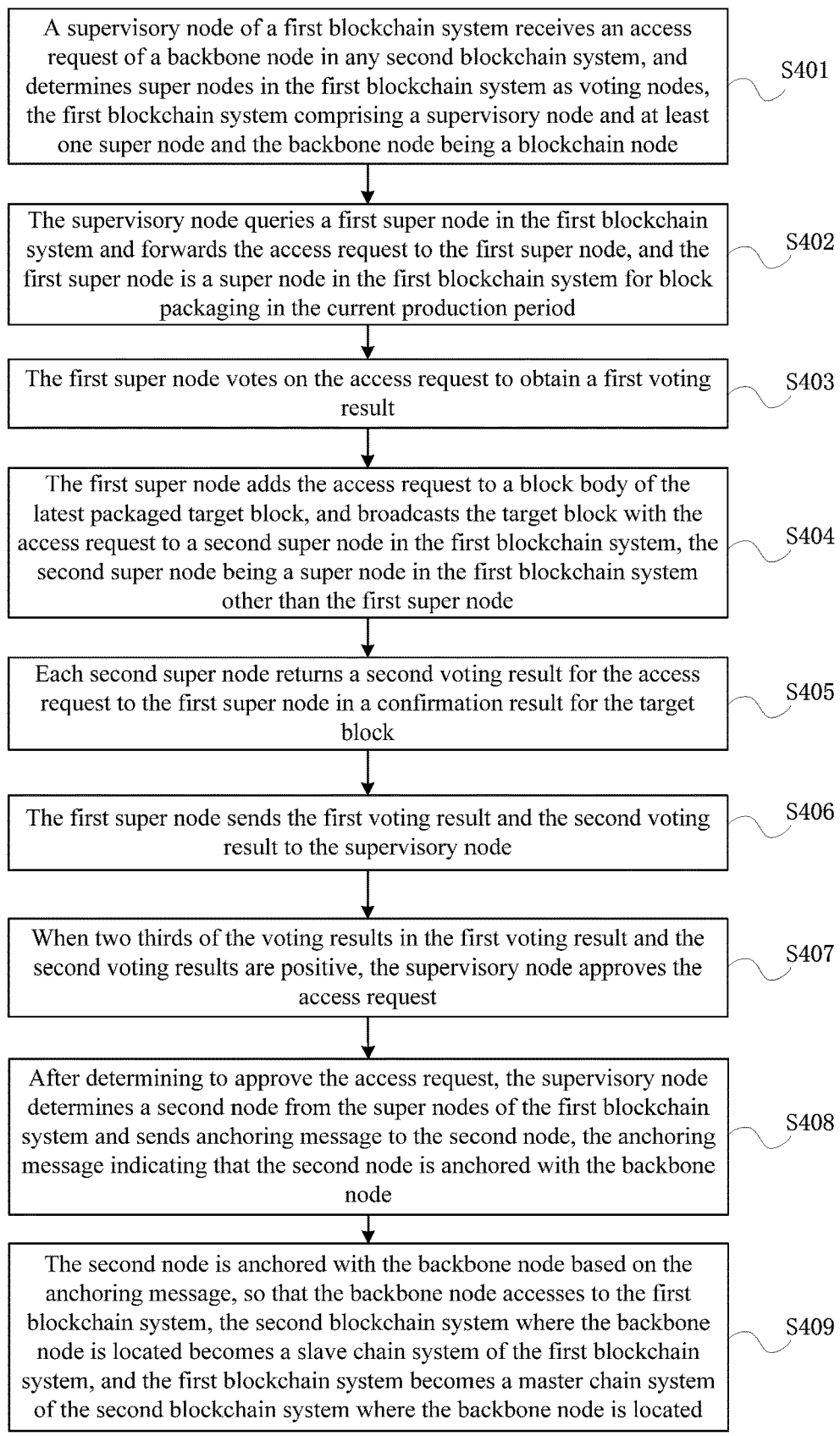
FIG. 10 shows a flowchart of still another backbone node access method according to an embodiment of the disclosure.

Refer to FIG. 10, which exemplarily shows a flowchart of a backbone node access method according to another embodiment of the disclosure. The steps included in this method are introduced below.

In S401, a supervisory node of a first blockchain system may receive an access request from a backbone node in any second blockchain system, and set at least one super node in the first blockchain system as a voting node, for example, all super nodes in the first blockchain system may be determined as voting nodes. The first blockchain system may comprise a supervisory node and at least one super node, and the backbone node is a blockchain node.

In this embodiment, the supervisory node may act as the first node in the aforementioned embodiment. Each super node in the first blockchain system may have a corresponding production time period and may be configured to perform block packaging in the corresponding production time period. A packaged block may be broadcast to all the other super nodes in the first blockchain system, and all the other super nodes may confirm the block. When more than two thirds of the super nodes in the first blockchain system confirm the block, the block may be considered irreversible and added to a blockchain corresponding to the first blockchain system.

In the first blockchain system, at least one super node may be elected from standby super nodes. The at least one super node may perform block packaging (i.e., generate blocks) in a plurality of consecutive time periods according to a preset order. Taking three super nodes as an example, three super nodes may perform block packaging in three consecutive time periods according to a preset order, for example, super node 2 performs block packaging in time period t1, super node 1 performs block packaging in time period t2, and super node 3 performs block packaging in time period t3.

In an example of the disclosure, S401 may be performed by the first blockchain system in the blockchain system.

In S402, the supervisory node may query a first super node in the first blockchain system and forward the access request to the first super node, and the first super node may be a super node in the first blockchain system for block packaging in the current production period.

In an example of the disclosure, S402 may be performed by the first blockchain system in the blockchain system.

In S403, the first super node may vote on the access request to obtain a first voting result.

In an example of the disclosure, S403 may be performed by the first blockchain system in the blockchain system.

In S404, the first super node may add the access request to a block body of the latest packaged target block, and broadcast the target block with the access request to a second super node in the first blockchain system, and the second super node may be a super node in the first blockchain system other than the first super node.

In practice, the first super node may also be called a production node. For example, in the above-mentioned time period t1, the super node 2 may be the first super node, and all the other super nodes may be the second super nodes. In the above-mentioned time period t2, the super node 1 may be the first super node, and all the other super nodes may be the second super nodes. In the above-mentioned time period t3, the super node 3 may be the first super node, and all the other super nodes may be the second super nodes.

Since the block packed by one super node may be broadcast to other super nodes for confirmation, in this embodiment, the first super node currently being used for block packaging may be determined from at least one super node, and then the access request may be forwarded to the first super node which in turn may carrys the access request in the packed target block and broadcast it to other super nodes (that is, the second super node).

For example, the access request may be added to the block body of the target block as transaction data. For example, the access request may be used as first transaction data in the block body of the target block. It can be understood that when inserting the access request into the target block, a field used to set transaction data volume in the target block need not be modified, so that after receiving the target block and identifying and extracting the access request therefrom, each second super node can delete the access request (the first transaction data) in the target block, and then confirm the target block, thus avoiding the influence on the confirmation process of the target block due to the insertion of the access request. It can be understood that the above operations of inserting the access request into the target block and deleting the first transaction data in the target block after each second super node receives the target block and extracts the access request therefrom may be deployed in the first blockchain system as a smart contract.

Based on the above process, the first super node and at least one second super node may obtain the access request, for example, each second super node may obtain the access request and vote on it. The voting by the first super node and the inserting the access request into the target block by the first super node may be performed in parallel.

Optionally, the access request may carry a preset tag, which is associated with a smart contract, and the smart contract may be provided with a verification mechanism for the access of the backbone node, for example, preset access conditions that the backbone node needs to meet during accessing, such as conditions that the technical performance of the backbone node needs to meet.

In the embodiment, the first super node may verify whether the backbone node meets the preset access conditions according to the information in the access request, and then obtain the first voting result according to a verification result. If the backbone node meets the preset access conditions, the first voting result is positive, otherwise it is negative.

Similarly, at least one second super node may verify whether the backbone node meets the preset access conditions according to the access request extracted from the target block, for example, each second super node may verify whether the backbone node meets the preset access conditions according to the access request extracted from the target block, and then obtain a second voting result according to a verification result. If the backbone node meets the preset access conditions, the second voting result is positive, otherwise it is negative.

In an example of the disclosure, S404 may be performed by the first blockchain system in the blockchain system.

In S405, at least one second super node returns the second voting result for the access request to the first super node in the confirmation result for the target block, for example, each second super node returns the second voting result for the access request to the first super node in the confirmation result for the target block.

At least one second super node may insert the obtained second voting result into a preset position of the confirmation result for the target block, for example, each second super node may insert the obtained second voting result into a preset position of the confirmation result for the target block and return it to the first super node. Correspondingly, the first super node may intercept the second voting result from the preset position of the obtained information.

In an example of the disclosure, S405 may be performed by the first blockchain system in the blockchain system.

In S406, the first super node sends the first voting result and the second voting result to the supervisory node.

In this embodiment, after obtaining the second voting results, the first super node may send the first voting result and the second voting results to the supervisory node together.

In an example of the disclosure, S406 may be performed by the first blockchain system in the blockchain system.

In S407, when two thirds of the voting results in the first voting result and the second voting results are positive, the supervisory node approves the access request.

In an example, if the total number of the first voting result and the second voting results is 21, then when there are 14 positive voting results, it can be determined that the access request is approved.

In an example of the disclosure, S407 may be performed by the first blockchain system in the blockchain system.

In S408, after determining to approve of the access request, the supervisory node determines a second node from the super nodes of the first blockchain system, and sends an anchoring message to the second node, wherein the anchoring message may indicate that the second node is anchored with the backbone node requesting access in the access request.

In an example of the disclosure, S408 may be performed by the first blockchain system in the blockchain system.

In S409, the second node is anchored with the backbone node based on the anchoring message, so that the backbone node requesting access in the access request accesses to the first blockchain system, the second blockchain system becomes a slave chain system of the first blockchain system, and the first blockchain system becomes a master chain system of the second blockchain system.

In an example of the disclosure, S409 may be performed by the first blockchain system in the blockchain system.

In this embodiment, the embodiments of S408 and S409 are similar to S103 and S104 in the previous embodiment which can therefore be used as a reference and will not be repeated here In the embodiment shown in FIG. 10, access verification of the backbone node is integrated into the on-chain confirmation process of the block, which reduces the possibility of malicious backbone node access, in other words, increases the security of backbone node access.

It is understood by those skilled in the art that the embodiments of the disclosure can be provided as methods, systems, or computer program products. Therefore, the disclosure may take the form of an entirely hardware embodiment, an entirely software embodiment, or an embodiment combining software and hardware aspects. Furthermore, the disclosure may take the form of a computer program product implemented on one or more computer usable storage media (including but not limited to magnetic disk memory, CD-ROM, optical memory, etc.) having computer usable program code embodied therein.

The disclosure is described with reference to flowcharts and/or block diagrams of the method, apparatus (system), and computer program product according to the embodiments of the disclosure. It is understood that each flow and/or block in the flowcharts and/or block diagrams, and combinations of flows and/or blocks in the flowcharts and/or block diagrams, may be implemented by computer program instructions. These computer program instructions may be provided to a processor of a general-purpose computer, special-purpose computer, embedded processor, or other programmable data processing apparatus to produce a machine, such that the instructions executed by the processor of the computer or other programmable data processing apparatus produce an apparatus for implementing the functions described in one or more flows in the flowcharts and/or one or more blocks in the block diagrams.

These computer program instructions may also be stored in a computer-readable memory which can direct a computer or other programmable data processing apparatus to function in a certain manner, such that the instructions stored in the computer-readable memory produce an article of manufacture including an instruction device which implements the functions described in one or more flows in the flowcharts and/or one or more blocks in the block diagrams.

These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the functions described in one or more flows in the flowcharts and/or one or more blocks in the block diagrams.

Although the preferred embodiments of the disclosure have been described, those skilled in the art can make additional changes and modifications to these embodiments once they know the basic concepts. Therefore, the appended claims are intended to be interpreted as including the preferred embodiment and all changes and modifications that fall within the scope of the disclosure.

Obviously, those skilled in the art can make various changes and modifications to the disclosure without departing from the spirit and scope of the disclosure. Thus, the disclosure is also intended to comprise such modifications and variations if they fall within the scope of the claims of the disclosure and their equivalents.

What is claimed is:

1. A backbone node access method, comprising:
   receiving, by a first node in a first blockchain system, an access request of a backbone node in a second blockchain system, determining a voting node in the first blockchain system, and requesting the voting node to vote on the access request, wherein the voting node is a super node and both the first node and the backbone node are blockchain nodes, the first node is a supervisor node in the first blockchain system;
   feeding back a voting result by the voting node;
   determining, by the first node, a second node from at least one super node of the first blockchain system after determining to approve of the access request according to the voting results, and sending an anchoring message to the second node, wherein the anchoring message is used to indicate that the second node is anchored with the backbone node; and
   anchoring the second node with the backbone node based on the anchoring message, so that the backbone node accesses the first blockchain system, the second blockchain system becomes a slave chain system of the first blockchain system, and the first blockchain system becomes a master chain system of the second blockchain system,
   each super node in the first blockchain system has a corresponding production time period and is used for block packaging in the corresponding production time period; and when determining a voting node in the first blockchain system, and requesting the voting node to vote on the access request,
   the first node determines at least one super node in the first blockchain system as a voting node, queries a first super node in the first blockchain system and forwards the access request to the first super node, the first super node being a super node in the first blockchain system for block packaging in the current production period;
   the first super node votes on the access request to obtain a third voting result;
   the first super node adds the access request to a block body of the latest packaged target block, and broadcasts the target block with the access request to a second super node in the first blockchain system, the second super node being a super node in the first blockchain system other than the first super node;
   at least one second super node returns a fourth voting result for the access request to the first super node in a confirmation result for the target block;
   the first super node sends the third voting result and the fourth voting result to the first node; and
   when the first node determines to approve of the access request according to the obtained voting results,
   if two thirds of the third voting result and the fourth voting result indicate consent to the access request, the first node determines to approve of the access request.

2. The method according to claim 1, wherein the first node is a super node in the first blockchain system, and the voting node comprises a super node in the first blockchain system other than the first node.

3. The method according to claim 2, wherein when determining to approve of the access request according to the voting results,
   the first node determines a first number, a second number and a third number according to the voting results, wherein the first number is the number of votes in the voting results that consented to the access of the backbone node, the second number is the number of votes in the voting results that opposed the access of the backbone node, and the third number is the number of votes in the voting results that were not fed back within a preset period of time; and if the first number is greater than the sum of the second number and the third number, it is determined to approve of the access request.

4. The method according to claim 3, wherein if the sum of the first number and the second number is smaller than the third number, the first node re-requests the voting node to vote on the access request.

5. The method according to claim 3, wherein when determining not to approve of the access request, the first node sets an interval period for the backbone node to initiate the next access request.

6. The method according to claim 3, wherein before determining the voting node in the first blockchain system, the method further comprises:

determining whether the backbone node has accessed the first blockchain system before, and;

if yes, obtaining a reputation value of the backbone node from a historical of the backbone node and obtaining a voting rate corresponding to the reputation value; and after determining the first number, the second number and the third number according to the obtained voting results, and before determining to approve of the access request, the method further comprises:

determining the sum of the first number, the second number and the third number, and if the quotient of the first number and the sum reaches the voting rate, determining to approve of the access request.

7. The method according to claim 6, wherein the reputation value is calculated based on an active rate, a reported rate and an overtime response rate of the backbone node, the active rate is the ratio of the number of transactions submitted by the backbone node to the total number of super node consensus times in the first blockchain system, the reported rate is the ratio of the number of reported times of the backbone node to the total number of reported times of the first blockchain system, and the overtime response rate is the number of overtime response times of the backbone node to the total number of overtime response times of the first blockchain system.

8. The method according to claim 1, wherein the access request contains first information, and the first information includes data values of one or more of the following data items: application node type, node authority, application enterprise type, organization code, applicant identity, and contact information.

9. The method according to claim 1, wherein determining the voting node in the first blockchain system comprises:

determining one super node in the first blockchain system as a verification node, and determining that other super nodes in the blockchain than the verification node are voting nodes; or, determining one super node in the first blockchain system as a verification node, and determining that a preset number of other super nodes in the blockchain than the verification node are voting nodes; and when the voting node feeds back a voting result, the voting node generates a first voting result, signs the first voting result through a private key of the voting node, and sends the first voting result and the signature information to the verification node;

the verification node verifies the signature information through a public key of the voting result, and if the verification is passed, gathers statistics on the first voting result; and the verification node feeds back a second voting result to the first node based on the first voting result.

10. The method according to claim 9, wherein when the verification node feeds back a second voting result to the first node based on the first voting result, based on the first voting result, the number of voting results that allow the backbone node to access the first blockchain system in the verified voting results is determined; and if the quotient of the number of vote results allowing the backbone node to access the first blockchain system and the total number of voting nodes reaches a preset threshold, the second voting result fed back by the verification node to the first node is approving of the access request, otherwise, the second voting result fed back by the verification node to the first node is disapproving of the access request.

11. The method according to claim 10, wherein the verification node feeds back a signature set together with the second voting result to the first node, and the signature set contains verified signature information; and when determining a second node from at least one super node of the first blockchain system, the first node determines a super node corresponding to at least one piece of signature information in the signature set; and a super node closest to the backbone node among the determined super nodes is determined as the second node, or a super node is selected from the determined super nodes according to the principle of random election to serve as the second node.

12. The method according to claim 1, wherein when determining a second node from at least one super node of the first blockchain system, a super node closest to the backbone node in the first blockchain system is determined as the second node; or according to the principle of random election, the second node is randomly elected from the super nodes of the first blockchain system.

13. The method according to claim 8, wherein after the second node is anchored with the backbone node based on the anchoring message, the second node generates second information according to node information of the backbone node, and sends the second information to the first node, the second information having the same data items as the first information;

the first node compares the data values of the same data items of the second information and the first information to determine whether they are the same; and if the data values of the same data items of the second information and the first information are the same, the first node generates a key pair, sends the key pair to the backbone node, and transfers the supervision rights of the backbone node to the second node after the second information and the node information of the backbone node are broadcast in the whole network, the node information of the backbone node being IP address and/or public key information.

14. The method according to claim 1, wherein the access request contains a preset tag, and at least one super node in the first blockchain system obtains the third voting result or the fourth voting result by: calling a smart contract corresponding to the preset tag according to the preset tag, verifying whether the access request meets preset access conditions, and obtaining the third voting result or the fourth voting result according to a verification result.

15. The method of claim 14, wherein when the determining, by the first node, to approve the access request according to the obtained voting results comprises:

determining, by the first node, to approve the access request in a case where two thirds of the third voting result and the fourth voting result indicate consent to the access request.

\* \* \* \* \*